United States Patent
Kim

(10) Patent No.: US 10,408,137 B2
(45) Date of Patent: Sep. 10, 2019

(54) METHOD AND APPARATUS FOR CONTROLLING ENGINE SYSTEM

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 148 days.

(21) Appl. No.: 15/807,417

(22) Filed: Nov. 8, 2017

(65) Prior Publication Data

US 2018/0135537 A1    May 17, 2018

(30) Foreign Application Priority Data

Nov. 11, 2016   (KR) .................. 10-2016-0150481

(51) Int. Cl.

| | | |
|---|---|---|
| *F02D 13/02* | (2006.01) | |
| *F02M 26/01* | (2016.01) | |
| *F02M 26/47* | (2016.01) | |
| *F02M 26/48* | (2016.01) | |
| *F02D 41/00* | (2006.01) | |
| *F02M 26/06* | (2016.01) | |

(Continued)

(52) U.S. Cl.
CPC ..... *F02D 13/0203* (2013.01); *F02D 41/0062* (2013.01); *F02M 26/01* (2016.02); *F02M 26/06* (2016.02); *F02M 26/47* (2016.02); *F02M 26/48* (2016.02); *F02D 41/1448* (2013.01); *F02D 2009/0276* (2013.01); *F02D 2200/0406* (2013.01); *Y02T 10/18* (2013.01); *Y02T 10/47* (2013.01)

(58) Field of Classification Search
CPC ............. F02D 13/0203; F02D 41/0062; F02D 41/1448; F02D 2200/0406; F02D 2009/0276; F02M 26/06; F02M 26/48; F02M 26/47; F02M 26/01; Y02T 10/47; Y02T 10/18

See application file for complete search history.

(56) References Cited

U.S. PATENT DOCUMENTS

2015/0192079 A1   7/2015  Akagi et al.

FOREIGN PATENT DOCUMENTS

| DE | 10 2012 210 303 A1 | 12/2013 |
|---|---|---|
| JP | 2001-221105 A | 8/2001 |
| JP | 2001-280202 A | 10/2001 |

(Continued)

*Primary Examiner* — Xiao En Mo

(74) *Attorney, Agent, or Firm* — Morgan, Lewis & Bockius LLP

(57) ABSTRACT

A method of and an apparatus for controlling an engine system having a continuous variable valve duration (CVVD) apparatus and an exhaust gas recirculation (EGR) apparatus may include: determining whether an EGR valve of the EGR apparatus is opened; determining an amount of an external EGR gas according to opening of the EGR valve and an amount of an internal EGR gas according to operation of the CVVD apparatus when the EGR valve is opened; comparing a value obtained by summing the amount of the external EGR gas and the amount of the internal EGR gas with an EGR limit value; and decreasing a duration of an intake valve when the value obtained by summing the amount of the external EGR gas and the amount of the internal EGR gas is greater than the EGR limit value.

12 Claims, 3 Drawing Sheets

(51) Int. Cl.
  *F02D 9/02*  (2006.01)
  *F02D 41/14*  (2006.01)

(56) References Cited

FOREIGN PATENT DOCUMENTS

| | | |
|---|---|---|
| JP | 2004-150343 A | 5/2004 |
| JP | 2007-332913 A | 12/2007 |
| JP | 2009-236012 A | 10/2009 |
| JP | 2012-197681 A | 10/2012 |
| KR | 10-2006-0047200 A | 5/2006 |
| KR | 10-1684558 B1 | 2/2016 |
| KR | 10-1655228 B1 | 9/2016 |

METHOD AND APPARATUS FOR CONTROLLING ENGINE SYSTEM

CROSS-REFERENCE TO RELATED APPLICATION

The present application claims priority to Korean Patent Application No. 10-2016-0150481 filed on Nov. 11, 2016, the entire contents of which is incorporated herein for all purposes by this reference.

BACKGROUND OF THE INVENTION

Field of the Invention

The present invention relates to a method of and an apparatus for controlling an engine system. More particularly, the present invention relates to a method of and an apparatus for controlling an engine system including a continuous variable valve duration (CVVD) apparatus and an exhaust gas recirculation (EGR) that can improve combustion stability and combustion efficiency.

Description of Related Art

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening or closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

Therefore, a continuous variable valve duration (CVVD) apparatus that can adjust a duration of a valve according to an operation state of the engine has been researched.

An exhaust gas recirculation (EGR) apparatus resupplies a portion of exhaust gas exhausted from the combustion chamber to the chamber.

In order to apply the CVVD apparatus and the EGR apparatus to the engine system, a method of diagnosing whether the CVVD apparatus and the EGR apparatus is normally operating is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of and an apparatus for controlling an engine system having advantages of being configured for improving combustion stability and combustion efficiency of an engine system including a continuous variable valve duration (CVVD) apparatus and an exhaust gas recirculation (EGR) apparatus.

A method of controlling an engine system including a continuous variable valve duration (CVVD) apparatus and an exhaust gas recirculation (EGR) apparatus according to an exemplary embodiment of the present invention may include: determining whether an EGR valve of the EGR apparatus is opened; determining an amount of an external EGR gas according to opening of the EGR valve and an amount of an internal EGR gas according to operation of the CVVD apparatus when the EGR valve is opened; comparing a value obtained by summing the amount of the external EGR gas and the amount of the internal EGR gas with an EGR limit value; and decreasing a duration of an intake valve when the value obtained by summing the amount of the external EGR gas and the amount of the internal EGR gas is greater than the EGR limit value.

The amount of the external EGR gas may be determined based on a pressure difference between a front end portion and a rear end portion of the EGR valve and an opening amount of the EGR valve.

The internal EGR gas may be determined based on a difference between an intake pressure and an exhaust pressure and a valve overlap between the intake valve and an exhaust valve.

The method may further include: comparing the duration of the intake valve with a threshold value; and maintaining an operation state of the CVVD apparatus when the duration of the intake valve reaches the threshold value.

The method may further include maintaining an operation state of the CVVD apparatus when the value obtained by summing the amount of the external EGR gas and the amount of the internal EGR gas is equal to or less than the EGR limit value.

An apparatus for controlling an engine system including a continuous variable valve duration (CVVD) apparatus and an exhaust gas recirculation (EGR) apparatus according to an exemplary embodiment of the present invention may include: a pressure difference detector configured for detecting a pressure difference between a front end portion and a rear end portion of an EGR valve; an intake pressure detector configured for detecting an intake pressure; an exhaust pressure detector configured for detecting an exhaust pressure; and a controller determining whether the EGR valve is opened and determining an amount of an external EGR gas according to opening of the EGR valve and an amount of an internal EGR gas according to operation of the CVVD apparatus, wherein the controller compares a value obtained by summing the amount of the external EGR gas and the amount of the internal EGR gas with an EGR limit value, and decreases a duration of an intake valve when the value obtained by summing the amount of the external EGR gas and the amount of the internal EGR gas is greater than the EGR limit value.

The controller may determine the external EGR gas based on the pressure difference between the front end portion and the rear end portion of the EGR valve and an opening amount of the EGR valve.

The controller may determine the internal EGR gas based on a difference between the intake pressure and the exhaust pressure and a valve overlap between the intake valve and an exhaust valve.

The controller may compare the duration of the intake valve with a threshold value, and maintains an operation state of the CVVD apparatus when the duration of the intake valve reaches the threshold value.

The controller may maintain an operation state of the CVVD apparatus when the value obtained by summing the amount of the external EGR gas and the internal EGR gas is equal to or less than the EGR limit value.

A method of controlling an engine system including a continuous variable valve duration (CVVD) apparatus and an exhaust gas recirculation (EGR) apparatus according to another exemplary embodiment of the present invention may include: determining whether an EGR valve of the EGR apparatus is opened; determining an amount of an external EGR gas according to opening of the EGR valve and an amount of an internal EGR gas according to operation of the CVVD apparatus when the EGR valve is opened; comparing a value obtained by summing the amount of the external EGR gas and the amount of the internal EGR gas with an EGR limit value; and decreasing a duration of an exhaust valve when the value obtained by summing the amount of the external EGR gas and the amount of the internal EGR gas is greater than the EGR limit value.

An apparatus for controlling an engine system including a continuous variable valve duration (CVVD) apparatus and an exhaust gas recirculation (EGR) apparatus according to another exemplary embodiment of the present invention may include: a pressure difference detector configured for detecting a pressure difference between a front end portion and a rear end portion of an EGR valve; an intake pressure detector configured for detecting an intake pressure; an exhaust pressure detector configured for detecting an exhaust pressure; and a controller determining whether the EGR valve is opened and determining an amount of an external EGR gas according to opening of the EGR valve and an amount of an internal EGR gas according to operation of the CVVD apparatus, wherein the controller compares a value obtained by summing the amount of the external EGR gas and the amount of the internal EGR gas with an EGR limit value, and decreases a duration of an exhaust valve when the value obtained by summing the amount of the external EGR gas and the amount of the internal EGR gas is greater than the EGR limit value.

According to an exemplary embodiment of the present invention, an internal EGR gas is adjusted by operation of a continuous variable valve duration (CVVD) apparatus, improving combustion stability and combustion efficiency of an engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
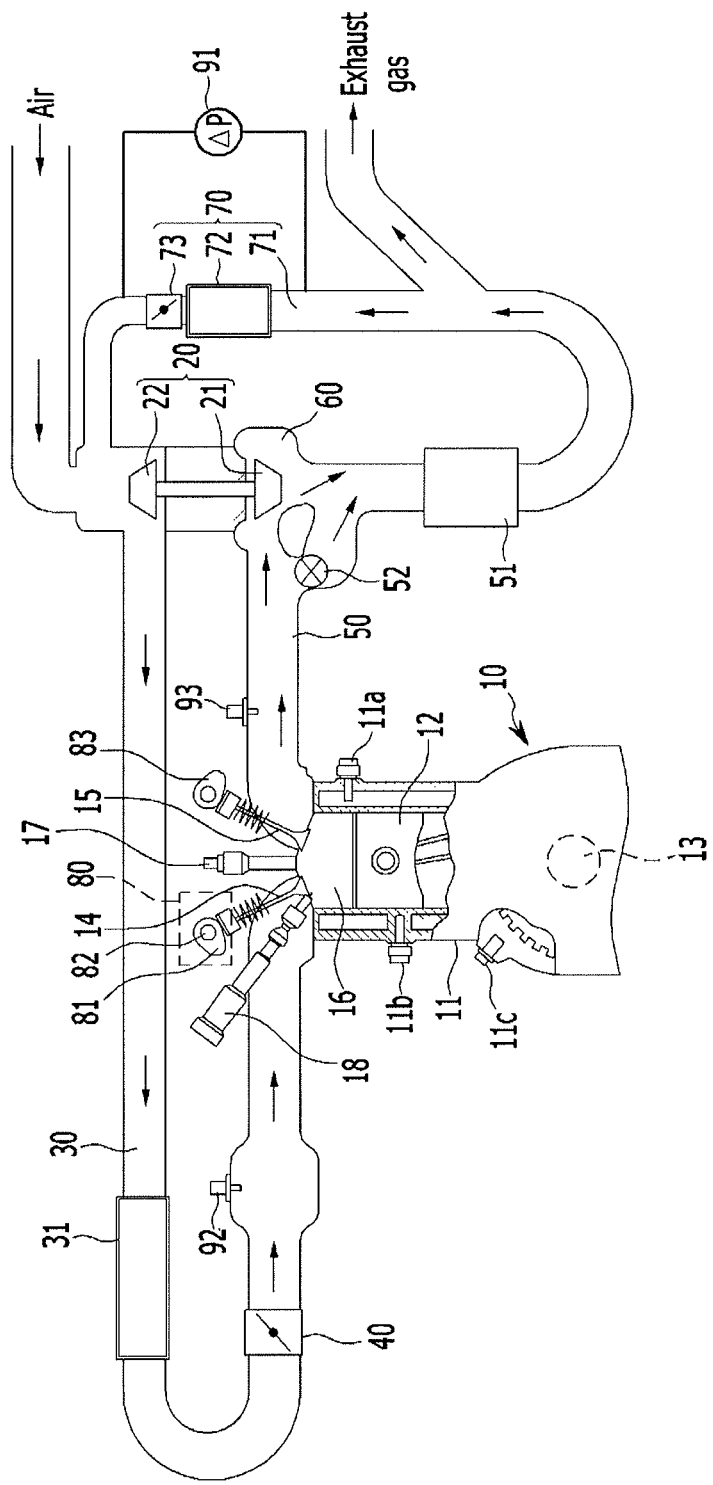
FIG. 1 is a schematic diagram of an engine system according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present application will be described more fully with reference to the accompanying drawings, in which exemplary embodiments of the invention are shown. However, the present invention is not limited to the exemplary embodiments described herein, and may be modified in various different ways.

The drawings and description are to be regarded as illustrative in nature and not restrictive. Like reference numerals designate like elements throughout the specification. The configurations illustrated in the drawings are arbitrarily shown for better understanding and ease of description, but the present invention is not limited thereto.

Figure 2:
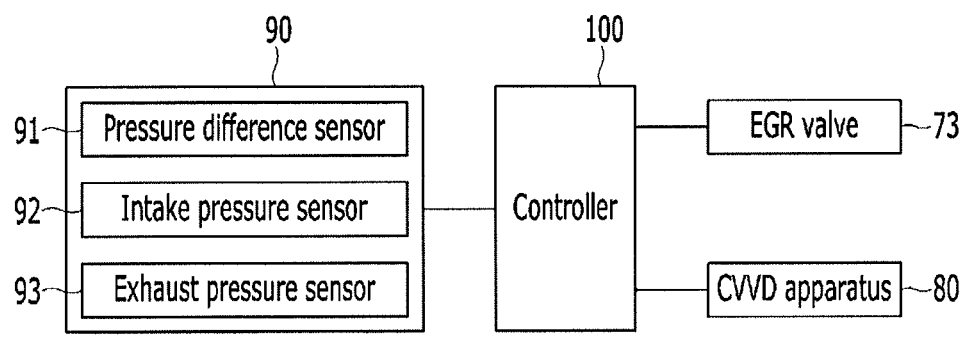
FIG. 2 is a block diagram of an apparatus for controlling an engine system according to an exemplary embodiment of the present invention.

FIG. 1 is a schematic diagram of an engine system according to an exemplary embodiment of the present invention, and FIG. 2 is a block diagram of an apparatus for controlling an engine system according to an exemplary embodiment of the present invention.

Referring to FIG. 1 and FIG. 2, an engine system according to an exemplary embodiment of the present invention may include an engine 10, a turbocharger 20, an intake line 30, a throttle valve 40, a first exhaust line 50, a second exhaust line 60, an exhaust gas recirculation (EGR) apparatus 70, and a continuous variable valve duration (CVVD) apparatus 80.

The engine 10 burns fuel and air to convert chemical energy into mechanical energy. The engine 10 includes a cylinder 11, a piston 12, a crankshaft 13, an intake valve 14, and an exhaust valve 15.

The piston 12 and the crankshaft 13 are mounted in the cylinder 11. The piston 12 reciprocates by explosive force of the fuel and rotates the crankshaft 13. A combustion chamber 16 is formed between the cylinder 11 and the piston 12.

The engine 10 is connected to the intake line 30 to receive air, and exhaust gas generated in a combustion process is exhausted to the outside of the engine 10 through the first exhaust line 50. The intake line 30 is opened or closed by the intake valve 14, and the first exhaust line 50 is opened or closed by the exhaust valve 15. The intake valve 14 may be operated by an intake cam 81 of the CVVD apparatus 80, and the exhaust valve 15 may be operated by an exhaust cam 83.

An injector 17 injects fuel into the combustion chamber 16, and a spark plug 18 ignited mixed gas in which the fuel and the air are mixed.

A coolant temperature sensor 11a, a knock sensor 11b, and a crankshaft position sensor 11c are mounted to the cylinder 11. The coolant temperature sensor 11a detects a temperature of coolant and transmits a signal corresponding thereto to a controller 100. The knock sensor 11b detects a vibration and transmits a signal corresponding thereto to the controller 100, and the controller 100 determines whether knocking occurs based on the signal of the knock sensor 11b. The crankshaft position sensor 11c detects a rotation angle of the crankshaft 13 and transmits a signal corresponding thereto to the controller 100, and the controller 100 determines an engine speed based on the signal of the crankshaft position sensor 11c.

The turbocharger 20 includes a turbine 21 and a compressor 22. The turbine 21 may rotate by the exhaust gas, and the compressor 22 may rotate by power occurring by a rotation of the turbine 21.

The intake line 30 supplies air to the engine 10. While the compressor 22 rotates, air entered from the outside is compressed to be supplied to the engine 10. Therefore, the compressed air is supplied to enhance an output of the engine 10. To cool air that passes through the compressor 22, an intercooler 31 may be mounted on the intake line 30.

The throttle valve 40 is mounted on the intake line 30, and flow of air supplied from the intake line 30 to the engine is controlled according to an opening degree of the throttle valve 40.

An intake pressure sensor 94 is mounted on the intake line 30 between the throttle valve 40 and the engine 10 and detects an intake pressure to transmit a signal corresponding thereto to the controller 100.

The first exhaust line 50 exhausts the exhausted gas exhausted from the engine 10 to the outside of a vehicle. A catalyst 51 may be mounted on the first exhaust line 50 to reduce harmful component of the exhaust gas.

The second exhaust line 60 is formed such that a portion of the exhaust gas joins to the first exhaust line 50 via the turbine 21. An amount of the exhaust gas that passes through the turbine 21 is controlled according to an opening amount of a wastegate valve 52 mounted on the first exhaust line 50.

An exhaust pressure sensor 95 is mounted on the first exhaust line 50 and detects an exhaust pressure to transmit a signal corresponding thereto to the controller 100.

The EGR apparatus 70 may include an EGR line 71, an EGR cooler 72, and an EGR valve 73.

The EGR line 71 may connect downstream of the catalyst 51 and the intake line 30. A portion of the exhaust gas exhausted from the catalyst 51 may be resupplied to the engine 10 via the EGR line 71.

The EGR cooler 72 is mounted on the EGR line 71 to cool the exhaust gas supplied to the intake line 30.

The EGR valve 73 is mounted on the EGR line 71. When the EGR valve 73 is opened, a portion of the exhaust gas exhausted from the catalyst 51 may resupplied to the engine 10 via the EGR line 71. When the EGR valve 73 is closed, the exhaust gas exhausted from the catalyst 51 is not resupplied to the engine 10 via the EGR line 71. An exhaust gas supplied to the intake line 30 via the EGR line 71 according to an opening amount of the EGR valve 73 is referred to as an external EGR gas.

The CVVD apparatus 80 adjusts a duration of the intake valve 14. The CVVD apparatus 80 includes the intake cam 81 and the camshaft 82. The CVVD apparatus 80 may change a relative rotation speed of the intake cam 81 with respect to the camshaft 82. In other words, the duration of the intake valve 14 increases or decreases according to operation of the CVVD apparatus 80. Since the CVVD apparatus 80 is described in Korean Patent Application No. 10-2015-0178650, detailed description thereof will be omitted. In addition, it is to be understood that entire contents included in Korean Patent Application No. 10-2015-0178650 are a reference and are entirely included in the present specification. The CVVD apparatus 80 described in Korean Patent Application No. 10-2015-0178650 is an example of a continuous variable valve duration (CVVD) apparatus to which the spirit or scope of the present invention may be applied, and the spirit or scope of the present invention may be applied to various CVVD apparatuses as well as the CVVD apparatus 80 described in Korean Patent Application No. 10-2015-0178650.

Valve overlap, which is a portion in which the intake valve 14 and the exhaust valve 15 are simultaneously opened, occurs according to operation of the CVVD apparatus 80, and thus a portion of the exhaust gas exhausted from the combustion chamber 16 may be resupplied to the combustion chamber 16. An exhaust gas supplied to the combustion chamber 16 according to operation of the CVVD apparatus 80 is referred to as an internal EGR gas. A temperature of the combustion chamber 16 may be lowered using the internal EGR gas. In an exemplary embodiment of the present invention, it is illustrated that the CVVD apparatus 80 adjusts the duration of the intake valve 14, but the scope or spirit of the present invention may be applied to a case in which the CVVD apparatus 80 adjusts a duration of the exhaust valve 15.

An apparatus for controlling an engine system according to an exemplary embodiment of the present invention may include a data detector 90, a controller 100, the EGR valve 73, and the CVVD apparatus 80.

The data detector 90 detects data for controlling the engine system, and the data detected by the data detector 90 is transmitted to the controller 100. The data detector 90 may include a pressure difference sensor 91, an intake pressure sensor 92, and an exhaust pressure sensor 93. The data detector 90 may further include sensors (e.g., an accelerator pedal position sensor, a brake pedal position sensor, a vehicle speed sensor, and so on) for controlling the engine system.

The pressure difference sensor 91 detects a pressure difference between a front end portion and a rear end portion of the EGR valve 73 and transmits a signal corresponding thereto to the controller 100.

The intake pressure sensor 92 detects an intake pressure of air flowing into the engine 10 and transmits a signal corresponding thereto to the controller 100.

The exhaust pressure sensor 93 detects an exhaust pressure of exhaust gas expelled from the engine 10 and transmits a signal corresponding thereto to the controller 100.

The controller 100 may determine an amount of the external EGR gas based on the signal of the pressure difference sensor 91 and the opening amount of the EGR valve 73. In addition, the controller 100 may determine an amount of the internal EGR gas based on the signal of the intake pressure sensor 92, the signal of the exhaust pressure sensor 93, and the valve overlap according to operation of the CVVD apparatus 80. The controller 100 may be implemented with at least one processor executed by a predetermined program, and the predetermined program may include a series of commands for performing each step included in a method of controlling an engine system according to an exemplary embodiment of the present invention. Further, the controller 100 may control operations of the EGR valve 73 and the CVVD apparatus 80 based on the data detected by the data detector 90.

Figure 3:
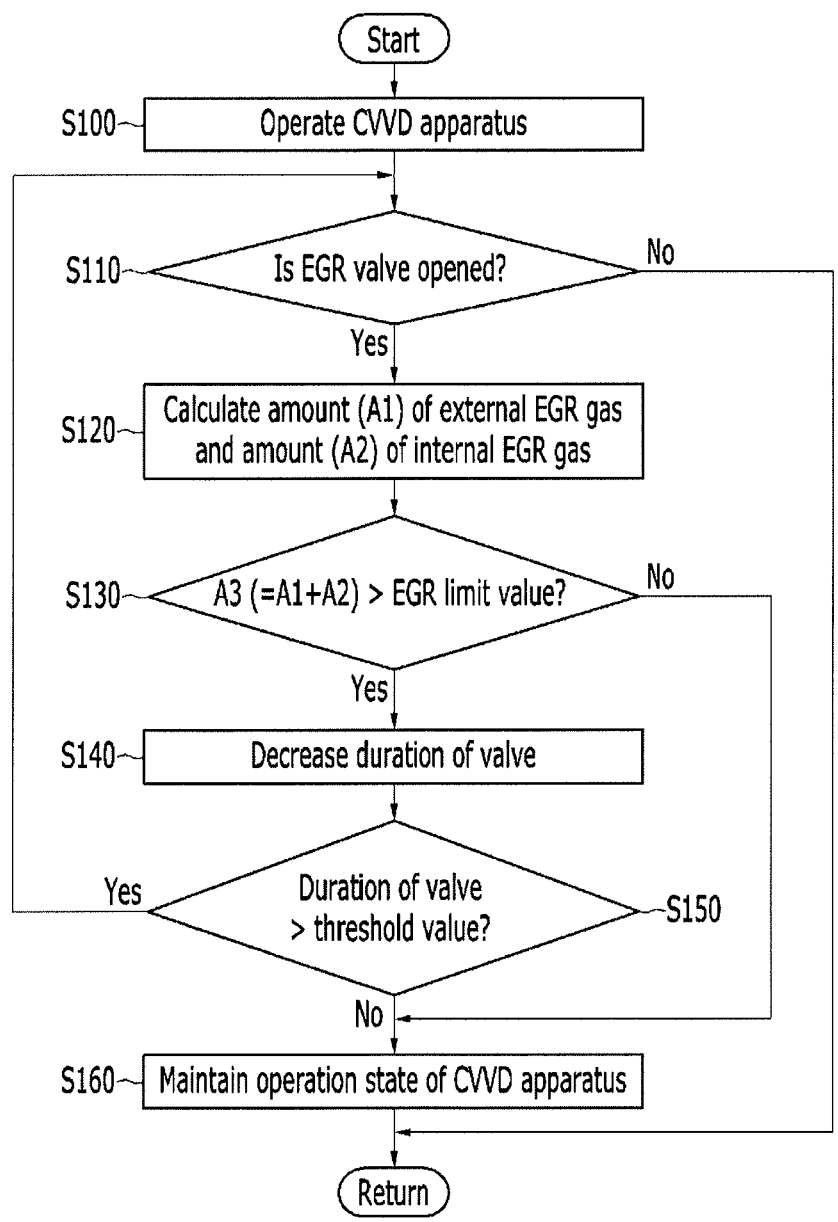
FIG. 3 is a flowchart illustrating a method of controlling an engine system according to an exemplary embodiment of the present invention.

FIG. 3 is a flowchart illustrating a method of controlling an engine system according to an exemplary embodiment of the present invention.

As shown in FIG. 3, the controller 100 determines a duration of the intake valve 14 according to an engine speed and an engine load, and operates the CVVD apparatus 80 to implement the determined duration of the intake valve 14 at step S100.

The controller 100 determines whether the EGR valve 73 is opened at step S110. The EGR valve 73 may be opened when the engine 10 is operated at a high load region.

When the EGR valve 73 is opened at step S110, the controller 100 determined an amount A1 of the external EGR gas according to opening of the EGR valve 73 and an amount A2 of the internal EGR gas according to operation of the CVVD apparatus 80 at step S120. The controller 100 may determine the amount A1 of the external EGR gas based on the pressure difference between the front end portion and the rear end portion of the EGR valve 73 and an opening amount of the EGR valve 73. In addition, the controller 100 may determine the amount A2 of the internal EGR gas based on a difference between the intake pressure and the exhaust pressure and the valve overlap between the intake valve 14 and the exhaust valve 15.

The controller 100 compares a value A3 obtained by summing the amount A1 of the external EGR gas and the amount A2 of the internal EGR gas with an EGR limit value B at step 5130. The EGR limit value B may be determined through an experiment in consideration of combustion efficiency and combustion stability of the engine 10. When exhaust gas of the EGR limit value or more is supplied to the engine 10, misfire may occur or combustion stability may be deteriorated.

When the value A3 obtained by summing the amount A1 and the amount A2 is greater than the EGR limit value B at step S130, the controller 100 operates the CVVD apparatus 80 to decrease the duration of the intake valve 14 at step S140. As the duration of the intake valve 14 decreases, the valve overlap decreases and the amount A2 of the internal EGR gas decreases. A decrease amount of the duration of the intake valve 14 may be determined through an experiment in consideration of combustion efficiency and combustion stability of the engine 10.

The controller 100 compares the duration of the intake valve 14 with a threshold value at step S150. For example, the threshold value may be a minimum duration of the intake valve 14 that is configured for being implemented by operation of the CVVD apparatus 80.

When the duration of the intake valve 14 is greater than the threshold value at step S150, the controller 100 may again perform the steps from S110. Steps S110 to S140 are iteratively performed and thus the duration of the intake valve 14 gradually decreases.

When the duration of the intake valve 14 reaches the threshold value at step S150, the controller 100 may maintain an operation state of the CVVD apparatus 80 at step S160. In the instant case, the duration of the intake valve 14 may be maintained at the minimum duration.

Meanwhile, when the value A3 obtained by summing the amount A1 and the amount A2 is equal to or less than the EGR limit value B at step S130, the controller 100 may maintain an operation state of the CVVD apparatus 80 at step S160. In the instant case, the duration of the intake valve 14 may be maintained at a duration configured for maximizing combustion efficiency of the engine 10.

In an exemplary embodiment of the present invention, it is illustrated that the CVVD apparatus 80 adjusts the duration of the intake valve 14, but even in a case in which the CVVD apparatus 80 adjusts a duration of the exhaust valve 15, the internal EGR gas may be adjusted with the method of controlling an engine system including steps S100 to S160.

As described above, according to an exemplary embodiment of the present invention, the internal EGR gas is adjusted by operation of the CVVD apparatus 80, improving combustion stability and combustion efficiency of the engine 10.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an engine system including a continuous variable valve duration (CVVD) apparatus and an exhaust gas recirculation (EGR) apparatus, the method comprising:
    determining whether an EGR valve of the EGR apparatus is open;
    determining an amount of an external EGR gas according to opening of the EGR valve and an amount of an internal EGR gas according to operation of the CVVD apparatus when the EGR valve is open;
    comparing a value obtained by summing the amount of the external EGR gas and the amount of the internal EGR gas with an EGR limit value; and
    decreasing a duration of an intake valve when the value obtained by summing the amount of the external EGR gas and the amount of the internal EGR gas is greater than the EGR limit value.

2. The method of claim 1, wherein the amount of the external EGR gas is determined based on a pressure difference between a front end portion and a rear end portion of the EGR valve and an opening amount of the EGR valve.

3. The method of claim 1, wherein the internal EGR gas is determined based on a difference between an intake pressure and an exhaust pressure and a valve overlap between the intake valve and an exhaust valve.

4. The method of claim 1, further including:
comparing the duration of the intake valve with a threshold value; and
maintaining an operation state of the CVVD apparatus when the duration of the intake valve reaches the threshold value.

5. The method of claim 1, further including maintaining an operation state of the CVVD apparatus when the value obtained by summing the amount of the external EGR gas and the amount of the internal EGR gas is equal to or less than the EGR limit value.

6. An apparatus for controlling an engine system including a continuous variable valve duration (CVVD) apparatus and an exhaust gas recirculation (EGR) apparatus, the apparatus comprising:
a pressure difference detector configured for detecting a pressure difference between a front end portion and a rear end portion of an EGR valve;
an intake pressure detector configured for detecting an intake pressure;
an exhaust pressure detector configured for detecting an exhaust pressure; and
a controller configured for determining whether the EGR valve is open and determining an amount of an external EGR gas according to opening of the EGR valve and an amount of an internal EGR gas according to operation of the CVVD apparatus,
wherein the controller is configured to compare a value obtained by summing the amount of the external EGR gas and the amount of the internal EGR gas with an EGR limit value, and decreases a duration of an intake valve when the value obtained by summing the amount of the external EGR gas and the amount of the internal EGR gas is greater than the EGR limit value.

7. The apparatus of claim 6, wherein the controller is configured to determine the external EGR gas based on the pressure difference between the front end portion and the rear end portion of the EGR valve and an opening amount of the EGR valve.

8. The apparatus of claim 6, wherein the controller is configured to determine the internal EGR gas based on a difference between the intake pressure and the exhaust pressure and a valve overlap between the intake valve and an exhaust valve.

9. The apparatus of claim 6, wherein the controller is configured to compare the duration of the intake valve with a threshold value, and is configured to maintain an operation state of the CVVD apparatus when the duration of the intake valve reaches the threshold value.

10. The apparatus of claim 6, wherein the controller is configured to maintain an operation state of the CVVD apparatus when the value obtained by summing the amount of the external EGR gas and the internal EGR gas is equal to or less than the EGR limit value.

11. A method of controlling an engine system including a continuous variable valve duration (CVVD) apparatus and an exhaust gas recirculation (EGR) apparatus, the method comprising:
determining whether an EGR valve of the EGR apparatus is open;
determining an amount of an external EGR gas according to opening of the EGR valve and an amount of an internal EGR gas according to operation of the CVVD apparatus when the EGR valve is open;
comparing a value obtained by summing the amount of the external EGR gas and the amount of the internal EGR gas with an EGR limit value; and
decreasing a duration of an exhaust valve when the value obtained by summing the amount of the external EGR gas and the amount of the internal EGR gas is greater than the EGR limit value.

12. An apparatus for controlling an engine system including a continuous variable valve duration (CVVD) apparatus and an exhaust gas recirculation (EGR) apparatus, the apparatus comprising:
a pressure difference detector configured for detecting a pressure difference between a front end portion and a rear end portion of an EGR valve;
an intake pressure detector configured for detecting an intake pressure;
an exhaust pressure detector configured for detecting an exhaust pressure; and
a controller configured for determining whether the EGR valve is open and determining an amount of an external EGR gas according to opening of the EGR valve and an amount of an internal EGR gas according to operation of the CVVD apparatus,
wherein the controller is configured to compare a value obtained by summing the amount of the external EGR gas and the amount of the internal EGR gas with an EGR limit value, and decreases a duration of an exhaust valve when the value obtained by summing the amount of the external EGR gas and the amount of the internal EGR gas is greater than the EGR limit value.

* * * * *